March 10, 1970 C. J. DONAHER ET AL 3,500,192
OSCILLATORY PROBE SYSTEM FOR CONTACTING AND TESTING
A CIRCUIT POINT THROUGH A HIGH DENSITY OF WIRES
Filed Jan. 16, 1967
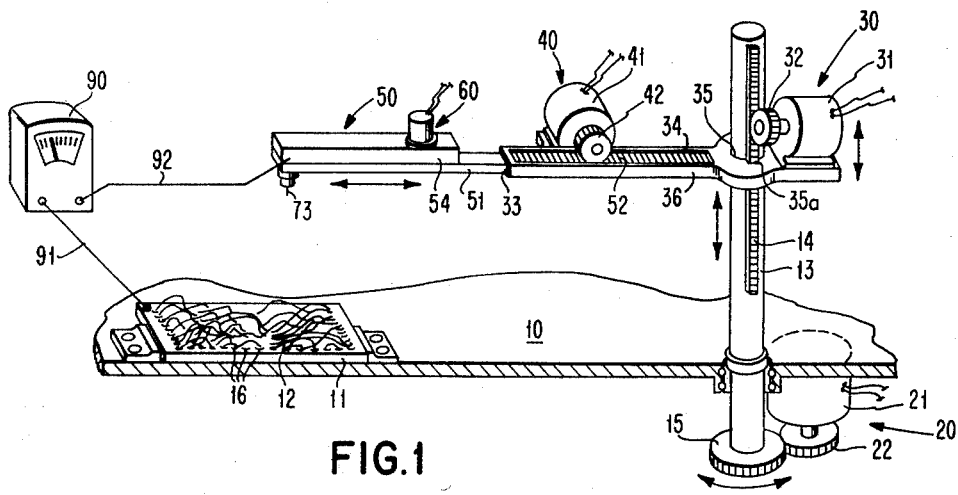
FIG.1
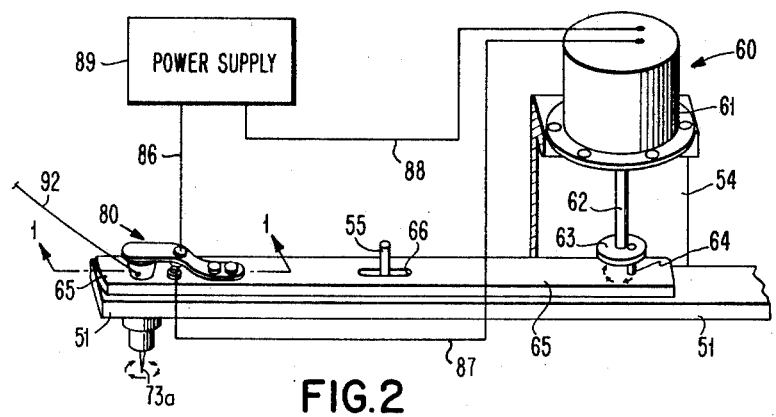
FIG.2
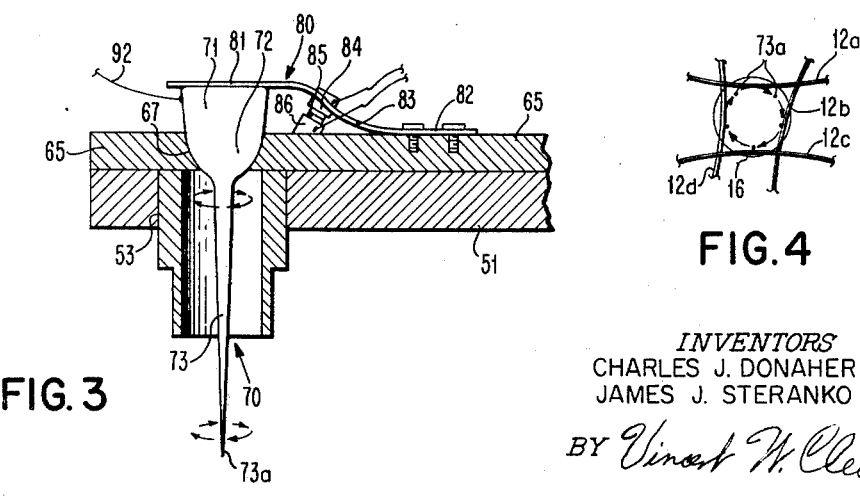
FIG.3
FIG.4
*INVENTORS*
CHARLES J. DONAHER
JAMES J. STERANKO
BY Vincent W. Cleary
ATTORNEY

United States Patent Office 3,500,192
Patented Mar. 10, 1970

3,500,192
OSCILLATORY PROBE SYSTEM FOR CONTACTING AND TESTING A CIRCUIT POINT THROUGH A HIGH DENSITY OF WIRES
Charles J. Donaher, Sunnyvale, and James J. Steranko, Saratoga, Calif., assignors to International Business Machines Corporation, Armonk, N.Y., a corporation of New York
Filed Jan. 16, 1967, Ser. No. 609,436
Int. Cl. G01r 31/02
U.S. Cl. 324—72.5                                    5 Claims

ABSTRACT OF THE DISCLOSURE

A system for testing a circuit board that utilizes an electrical probe that is automatically moved in two directions over a circuit point on the circuit board. The probe is then lowered toward the circuit point through a high density of wires. While it is being lowered, the probe is oscillated in a circular motion. When the probe contacts the circuit point, the oscillation ceases and electrical measurement can then be taken.

BACKGROUND OF THE INVENTION

Field of the invention

Component testing machine.

Description of prior art

With high density integrated circuits, a high density of wires normally results to provide the input and output connections for the high density monolithic integrated chips. As a result of this high density, testing of the circuits becomes difficult to locate due to the interference of the wires. This difficulty is particularly important when it is desired to automatic or program test the circuit points below the high density wiring. With conventional techniques, an electrical probe being advanced toward a circuit point will frequently break the wires and/or the wires will prevent the probe from achieving electrical contact with a predetermined circuit point. Consequently, automatic testing with high density wiring although highly desirable is normally quite impractical due to the interference caused by the high density wiring.

Accordingly, an object of the invention is to provide a new and improved probe for locating a circuit point.

Still another object of the invention is the provision of a testing method and system for automatically testing a circuit in an environment of high density wiring.

A still further object of the invention is to provide an electrcal probe for a testing system which will have a minimum of interference in locating a testing point below a high density of wires.

A still further object of the invention is the provision of a method and testing system for automatically testing a circuit board having a high density of discrete wiring on one side of the circuit board.

SUMMARY OF THE INVENTION

These and other objects of the invention are realized in the present invention by an electrical probe for an electrical measuring means which probe is oscillated as it is brought down through an environment of high density wiring. By the use of such oscillation, the probe in a sense "wiggles" its way through this high density wiring and displaces the wiring with a minimum tension on the wires so as to prevent breaking of the wires. In addition, this oscillation tends to minimize the possibility of the wires being placed between the oscillating probe and the desired circuit contact point.

As a further feature of the invention, when the probe is in electrical contact with the circuit point, the probe will discontinue oscillations.

These and other objects of the invention will be pointed out in the following description and illustrated in the accompanying drawings in which:

BRIEF DESCRIPTION OF THE DRAWING

FIG. 1 illustrates an isometric view of an automatic testing machine embodying the invention;

FIG. 2 illustrates a cutaway isometric view of a portion of the embodiment illustrated in FIG. 1;

FIG. 3 illustrates a cross-section view of lines 1—1 of FIG. 2; and

FIG. 4 illustrates the elevation view of the action of the electrical probe embodying the invention.

The embodiment illustrated in the drawings comprises a testing method and machine for testing circuits and circuit boards having, on one side, a high density of discrete wiring. A probe 70 is mounted on a support 50. The support 50 is positioned over the desired electrical contact on a circuit board by motor, gear-rack, actuators 40 and 20. Motor actuator 20 rotates a post 13 to thereby rotate the mounting assembly 50. The motor or actuating means 40 moves the support 50 and probe 70 outwardly of the post 13. Thus, with the proper analog signal to the actuating means 20 and 40, probe 70 can be positioned directly over a predetermined contact point such as point 16 on the board 11. The board 11 has a high density of wires 12. The probe 70 is connected to an electrical measuring means such as a volt meter or an ohm meter 90. After the probe 70 is positioned over the point 16, an actuating means 30 lowers the mounting assembly 50 and the probe 70 toward the point 16. During this lowering and as the probe 70 passes through the high density of wires 12, a circular oscillation is effected to the probe 70 and its tips 73a by an actuator 60. Due to this circular motion, the probe 70 "wiggles" its way through the wires 12 as it moves downward toward the contact 16. As shown in FIG. 4 as the point 73a rotates, it displaces the wires 12a, 12b, 12c and 12d. The rotary speed of the rotating probe is approximately equal to the natural frequency of the wires and as such the wires are displaced with the minimum of tension to the wires. When the probe comes into contact with the contact 16, a trip means 80 is actuated to deactivate the oscillating actuator 60 and thereby discontinue the rotation of the probe 70. The probe is held in this position until the desired measurements are taken from the meter 90. It will be understood that the output of the meter 90 can be entered in a general purpose computer and later analyzed, etc. The meter 90 is shown in this embodiment by way of illustration only.

DESCRIPTION OF THE PREFERRED EMBODIMENTS

As stated above, the probe 70 is positioned directly over the desired contact point of a board 11 by actuating means 20 and 40. More specifically, the embodiment illustrated in the drawings comprises a support table 10 which supports the circuit board to be tested 11 having wires 12 and a predetermined circuit contact 16 under these densely populated wires. A shaft 13 is rotatably mounted on the support table 10 by way of some suitable bearings, for instance, illustrated as ball bearings in the drawings. Mounted on the lower portion of this shaft 13 is a gear 15 with the upper portion having a gear rack 14 fixedly secured thereto. The rotating actuating means 20 includes a motor 21 which drives the gear 22. The gear 22 drives the gear 15 so that the motor 21 will, in response to signals, rotate shaft 13 to provide the correct angular relationship between the mounting assembly 50 and the point 16.

While the motor 21 is rotating the shaft for the correct angular relationship with the point 16, the actuator 40 moves the frame supporting assembly 50 and the probe 70 outwardly from the post 13. A supporting rod assembly 30 maintains the assembly 50 and the probe 70 at a given height over the board while the actuating means 20 and 40 are positioning the probe over the point 16. The assembly 30 includes an arm 36 having a keyhole aperture that is a circular aperture 35 with an extending rectangular aperture 35a therein. The circular aperture 35 receives therethrough the post 13 while the rectangular aperture 35a receives the rack 14 therethrough. Also mounted on the arm 36 is a motor 31 that drives a gear 32 to effect movement of gear 32 up and down rack 14. When the motor 31 is not being driven, the gear 32 and motor 31 maintain the arm 36 in a fixed height above board 11 by some suitable latching means or by the motor 31 itself.

On the other side of the arm 36 is a longitudinally extending slot 33 that receives one end 52 of an arm 51. The portion 52 of arm 51 is a gear rack as shown in FIGURE 1. A rectangular aperture 34 extends through the arm 36 to the horizontal slot 33 that receives the gear rack 52.

The actuating means 40 includes a motor 41 mounted on arm 36 that drives a gear 42. The gear 42 is positioned to be in driving relationship with the rack 52 through the rectangular slot 34. Thus, when the motor 41 is driven, the gear 42 effects a linear motion of the arm 51 in the assembly 50 either away from or towards the post 13.

After the actuating means 20 and 40 effect placement of the probe 70 directly over the desired circuit point 16, the vertical or height actuator 30 is energized to lower the probe towards the point 16. Thus actuating means 30 can effect raising or lowering of the probe towards or away from the contact point 16.

FIGURES 2 and 3 illustrate in more detail the support assemblies 50, the vibrating actuator 60, the probe 70 and the interrupt means 80. The support assembly 50 includes an arm 51 with the gear rack 52 at one end and a rectangular housing 54 at the other end. Also at the other end is a cylindrical guard member 53 that extends downwardly from and provides an aperture through the arm member 51. Mounted on this member 51 is the housing 54 shown in FIGURES 1 and 2 which supports the vibrating actuator 60. This vibrating actuator 60 includes the motor 61 mounted on housing 54 that drives a shaft 62 having a disk 63 that is driven therewith. A pin 64 is rotatably mounted in the disk 63 off-center of the shaft 62 at one end and rotatably mounted in a reciprocating bar 65 at the other end.

A pivot pin 55 is fixedly secured to the member 51 and it extends upwardly therefrom through a slot 66 in reciprocating arm 65. At the other end of the reciprocating arm 65 is a bowl-like or semispherical aperture 67 having an aperture extending therethrough.

Electrical probe 70 is mounted to seat within the bowl-shaped aperture 67 and extend through this aperture and through the cylindrical guard 53. As shown in FIGURE 2, the probe 70 includes an upper cylindrical section 71, a middle semispherical section 72 and a spike or pin section 73 having an end 73a to contact the desired circuit point such as 16. The semispherical or bowl section 72 fits snugly into the bowl or semispherical aperture 67 of the bar 65.

A switch and spring means 80 is provided to keep the semispherical section 72 and the aperture 67 in intimate contact. This spring has a lower section 82 fixedly secured to the arm 65 with an upper section 81 that tends to push the upper portion of probe 70 downwardly so as to seat the semispherical section 72 on the semispherical aperture 67. As shown in FIGURES 2 and 3, the intermediate section 83 of spring 80 has a contact 84 mounted thereon. When the spring normally is capable of holding the probe seated in recess 67, this contact 84 is in contact with electrical contact 85. When, however, there is pressure at point 73a of probe 70, these two contacts will disengage and provide no current path therebetween. Contacts 84 and 85 are electrically insulated from all parts except leads 86 and 87, respectively.

The contact 84 is connected to lead 86 shown in FIG. 2. The contact 85 is connected to electrical lead 87. The lead 87 is connected to the actuator motor 61 which has another lead 88 connected to the power supply 89. Power supply 89 supplies the power to drive motor 67. Lead 86 also has its other end connected to the power supply 89. Thus, it will be seen that when the end of probe 70, that is 73a, provides substantial contact with a reference point such as 16, probe 70 will be unseated from aperture 67, the contacts 84 and 85 will be disengaged, the power to the motor 61 will be discontinued and the probe 70 will discontinue its oscillations.

As shown in FIGURES 1 and 3, the probe 70 is connected, at its upper end to a lead 92 of the test instrument 90. The only electrical contact probe 70 has is with lead 92. The other lead 91 of the test instrument 90 is connected to a preselected point on the circuit board 11. Thus, while the end 73a of probe 70 is in contact with a preselected contact 16, readings are taken from a testing instrument symbolically shown as a meter 90, to test the board 11.

OPERATION

The probe 70, and more specifically, the point of the probe, 73a, is positioned vertically directly above a circuit point such as 16 by providing proper input voltages to the motors 21 and 41 of the actuators 20 and 40 respectively. The probe is lowered preferably after it is positioned directly over point 16. It is then lowered from the position shown in FIGURE 1, by the motor 31 being actuated so as to drive gear 32 that is in contact with gear rack 14. Thus, it will be seen that by these three actuators the probe 70 and its point 73a, are programmed to travel toward the preselected contact point 16. As the support assembly 50 and probe 70 are moved downwardly by the actuating means 30, the power supply 88 actuates the motor 61 so as to rotate pin 64 to provide a reciprocating motion to the reciprocating bar 65. Due to the pivot 55, the end of the bar 65 effects a rotating motion to the probe 70 and point 73a. This rotation is small so that during this rotation probe 70 does not touch this inner wall of guard 53.

The above-mentioned rotating motion is shown in FIGURE 4 with four wires, 12a, 12b, 12c and 12d which come in contact with the point 73a so as to permit the point 73a to wiggle through to the point 16. It will be understod that the amount of rotating imparted to the point 73a is in fact very small and has a diameter less than the contact point 16. The rotation of this point is at a frequency which is approximately the natural frequency of the wires so as to force the wires back with a minimum of tension on the wires. This rotation continues until the point 73a is in substantial contact with the point 16 so as to stop downward movement of the probe 70. More specifically, so that the semispherical section 72 of the probe 70 is out of contact or seating relationship with the recess 67. When this occurs, the two contacts 84 and 85 interrupt the electrical contact so as to open the power supply circuit to the motor 61 and thereby discontinue the vibration of the probe 70.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A testing system for use in an environment of a high density of wires comprising a conductive probe member, electrical measuring means electrically connected to said conductive member, means lowering said probe toward a circuit contact point;

means effecting oscillation of said conductive probe member for displacing wires in the path of oscillation while said probe is being lowered toward said contact point, said means effecting oscillation comprising a movable armature connected to said probe and drive means connected to said armature, and means connected to said probe for sensing the electrical condition of said point when said probe contacts said point.

2. A testing system as set forth in claim 1 wherein said oscillation is non-linear, means responsive to contact of said probe with said contact point to discontinue oscillations of said probe.

3. A testing system as set forth in claim 2 wherein the oscillation of said probe member is circular.

4. A testing system as set forth in claim 3 wherein the diameter of the circular oscillation of the probe member is smaller than the said contact point.

5. A testing system for use in an environment of a high density of wires having a circuit point to be contacted comprising a conductive probe member, electrical measuring means electrically connected to said conductive member, means effecting oscillation of said conductive probe member to move or displace some of said wires and provide an opening therethrough for said probe member to make contact with said circuit contact point, means responsive to contact of said probe member with said point to discontinue oscillations of said probe.

References Cited

UNITED STATES PATENTS

| | | | |
|---|---|---|---|
| 2,820,947 | 1/1958 | Gunn | 324—72 |
| 3,207,982 | 9/1965 | Rose | 324—71 |
| 3,246,239 | 4/1966 | Olney | 324—72 |

RUDOLPH V. ROLINEC, Primary Examiner

E. L. STOLARUN, Assistant Examiner

U.S. Cl. X.R.,

324—51; 339—108